United States Patent [19]

Shimizu et al.

[11] Patent Number: 5,138,241
[45] Date of Patent: Aug. 11, 1992

[54] RAINDROP DETECTOR FOR A WIPER MOTOR

[75] Inventors: Hiroyuki Shimizu; Masaru Kato; Yasuki Matsumoto; Yoshinori Nagamine, all of Yokohama, Japan

[73] Assignee: Jidosha Denki Kogyo K.K., Kanagawa, Japan

[21] Appl. No.: 642,586

[22] Filed: Jan. 17, 1991

[30] Foreign Application Priority Data

Jan. 18, 1990 [JP] Japan ............................. 2-3367[U]

[51] Int. Cl.⁵ ............................................. B60S 1/08
[52] U.S. Cl. ................................ 318/483; 318/444; 318/DIG. 2
[58] Field of Search ......... 318/443, 444, 483, DIG. 2; 15/250 C, 250.12, 250.17

[56] References Cited

U.S. PATENT DOCUMENTS

| | | | |
|---|---|---|---|
| 4,527,105 | 7/1985 | Shiraishi | 318/444 |
| 4,542,325 | 9/1985 | Kobayashi et al. | 318/483 |
| 4,603,316 | 7/1986 | Kobayashi et al. | 340/52 R |

FOREIGN PATENT DOCUMENTS

| | | | |
|---|---|---|---|
| 62-1663 | 1/1987 | Japan | 15/250 C |
| 62-26148 | 2/1987 | Japan | 15/250.12 |
| 62-238149 | 10/1987 | Japan | 15/250 C |

Primary Examiner—Bentsu Ro
Attorney, Agent, or Firm—Sughrue, Mion, Zinn, Macpeak & Seas

[57] ABSTRACT

A raindrop detector comprises a vibration detection unit, a signal converter unit for converting the electrical signal output from the vibration detection unit into a data signal, a memory for storing data of the data signal converted by the signal converter unit and for outputting a signal to a wiper motor, and a cancel circuit for cancelling the data. According to this invention, it is possible to improve the control accuracy of the wiper motor because the distance to send the data signals to the memory from the signal converter unit shortens and the data signal is independent of radio interference.

2 Claims, 4 Drawing Sheets

RAINDROP DETECTOR FOR A WIPER MOTOR

BACKGROUND OF THE INVENTION

1. Field of the Invention

The present invention relates to a raindrop detector used to automatically operate the wiper by detecting raindrops.

2. Description of the Prior Art

FIG. 4 shows an example of a conventional raindrop detector.

The illustrated raindrop detector (100) consists of a vibration device (101) comprising a piezoelectric or electrostriction element and an amplifier (102) connected to the vibration device (101). The detector is installed on the bonnet of a car body 1, which is not illustrated, so that raindrops on the vehicle can be detected easily.

A vibration plate, which is not illustrated, mounted on the above-mentioned vibration device (101) resonates when raindrops hit the plate and raindrop vibration components are converted into electrical signals, which are amplified by the above-mentioned amplifier (102) and are input to the control circuit (103), which is installed in a separate position from the above-mentioned bonnet through a data line (104).

After the above-mentioned electrical signal is processed by the above-mentioned control circuit (103), the power supplied by turning on a wiper switch, which is not illustrated, is fed to the wiper motor (106) through the drive circuit (105) to operate the wiper motor (106) at the intermittent period corresponding to the above-mentioned electrical signal.

By this operation, a wiper blade coupled to the wiper motor (106), but not illustrated, wipes the wiping surface.

In the above-mentioned conventional raindrop detector (100), the electrical signal output from the amplifier (102) is an electrical signal obtained by amplifying frequency at the time when the vibration plate vibrates owing to the impact of raindrops. The electrical signal amplified by the amplifier (102) is transferred to the control circuit (103) through the data line (104). The signal input to the control circuit (103) is output to the drive circuit (105) after being processed in the control circuit (103), and the wiper motor (106) is so designed as to be driven by the signal processed in the control circuit (103) through the drive circuit (105) and to actuate the wiper blade.

Therefore, there is a problem in that the raindrop detector (100) does not provide good response characteristics because the signal requires a lot of time to arrive in the drive circuit (105) from the amplifier (102) through the data line (1040) and the signal processor means in the control circuit (103). The challenge is to solve the aforementioned problem.

SUMMARY OF THE INVENTION

This invention has been devised to solve the above-mentioned problem, and it is an object to provide a raindrop detector which provides excellent response characteristics and which can output electrical signals correctly to control the wiper motor by a simply structured system.

The raindrop detector according to this invention comprises: A vibration detection unit for detecting raindrop vibration and converting it into an electrical signal, a signal converter unit for converting the electrical signal into a data signal, a memory means for storing the data of the data signal and outputting an output signal to a wiper motor, and a cancel means for cancelling the data every rotation of the wiper motor.

In the raindrop detector of this invention, the vibration detector unit detects the vibration of raindrops and converts it into electrical signals, which are converted into data signals by the signal converter unit. The memory means stores the data of the data signals and outputs an output signal to the wiper motor. The cancel means cancels the above-mentioned data according to an external signal so that the output signal stored by the memory means outputs to the wiper motor. When the output to this wiper motor is cancelled by the cancel means, the output signal of the latest data outputs to the wiper motor. The memory means is provided inside the raindrop detector so that the transfer distance of data signals between the signal converter and memory means becomes short and the transfer speed of the data signals increases.

DESCRIPTION OF THE PREFERRED EMBODIMENT

Figure 1:
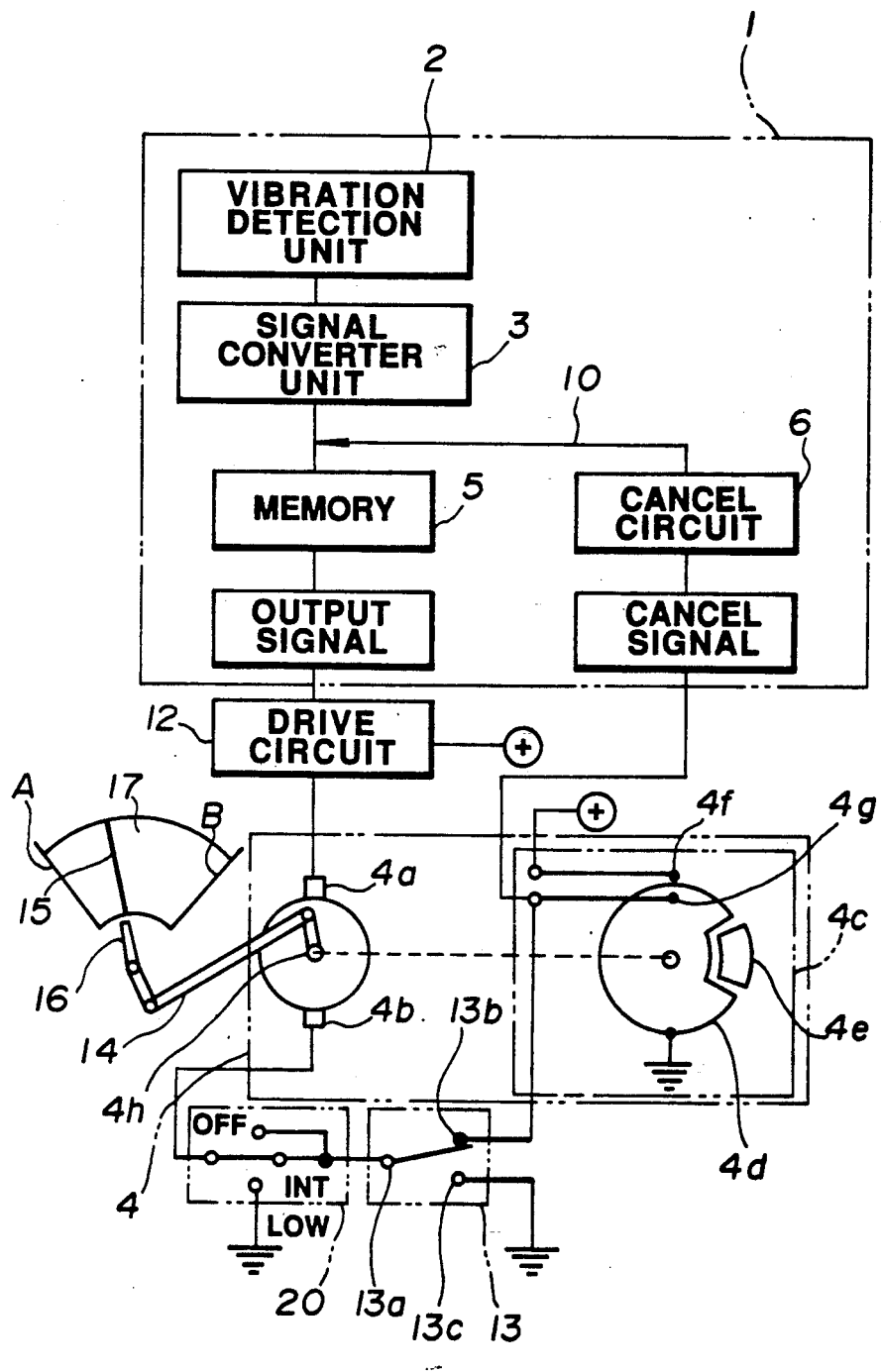
FIG. 1 is a schematic block diagram showing the raindrop detector according to an embodiment of this invention.

Using FIGS. 1 to 3, a preferred embodiment of the raindrop detector is described below.

An illustrated raindrop detector (1) comprises a vibration detection unit (2) to detect raindrop vibration and convert the vibration into electrical signals, a signal converter unit (3) convert the above-mentioned electrical signals into data signals, a memory (5) to store the data of the above-mentioned data signals and to output signals to a wiper motor (4), and a cancel circuit (6) to cancel the above-mentioned data according to an external signal. The respective components are housed in a shielding case (18) which is mounted, as shown in FIG. 3, on the bonnet of a car body B on which raindrops can be easily detected. In FIG. 3, vibration plate (2a) of the vibration detection unit (2) is disposed on the upper surface of the shielding case (18) and, an integrated circuit, capacitors, resistors and so on forming the signal converter unit (3), the memory (5) and the cancel circuit (6) are fixed on a printed circuit board 19.

The above-mentioned vibration unit (2) is provided with a vibration plate (2a) and so designed as to convert raindrop vibration components into electrical signals according to resonance of the vibration plate (2a) when raindrops hit it.

The above-mentioned signal converter unit (3) consists of an operational amplifier (7), capacitor $C_1$ and resistors $R_1$ and $R_2$ and converts the above-mentioned electrical signals input to the (+) input terminal into data signals for output from the output terminal.

The memory (5) consists of a PNP-type transistor $Tr_1$, NPN-type transistor $Tr_2$, resistors $R_3$, $R_4$, $R_5$, $R_6$, $R_7$ and $R_8$, capacitor $C_2$ and diode $D_1$, to store data signals converted by the foregoing signal converter unit (3) and to output signals from the output terminal (8).

The cancel circuit (6) consists of a cancel line (10) to input a cancel signal from a cancel terminal (9).

Figure 2:
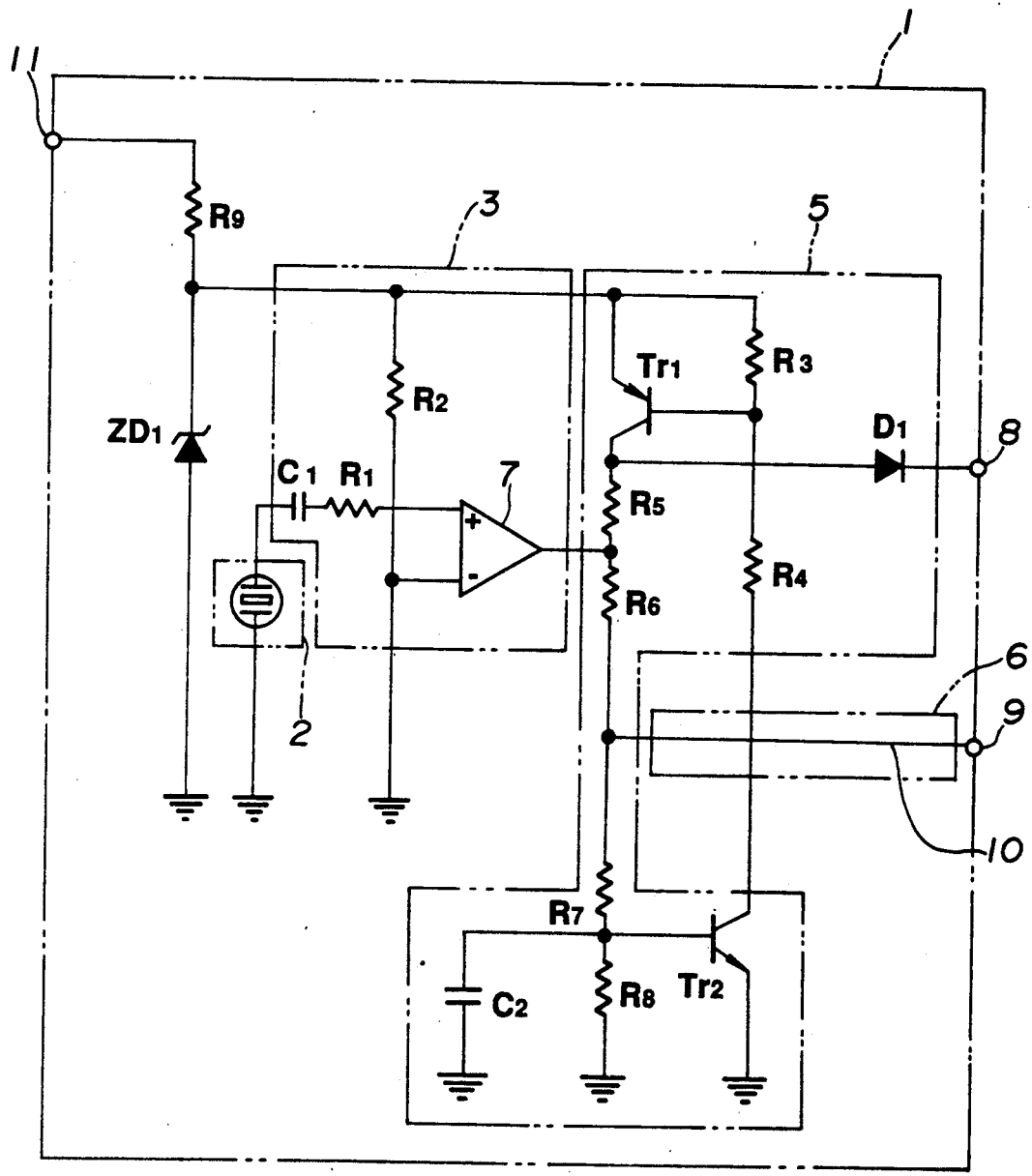
FIG. 2 is a circuit diagram of the raindrop detector shown in FIG. 1.
Figure 3:
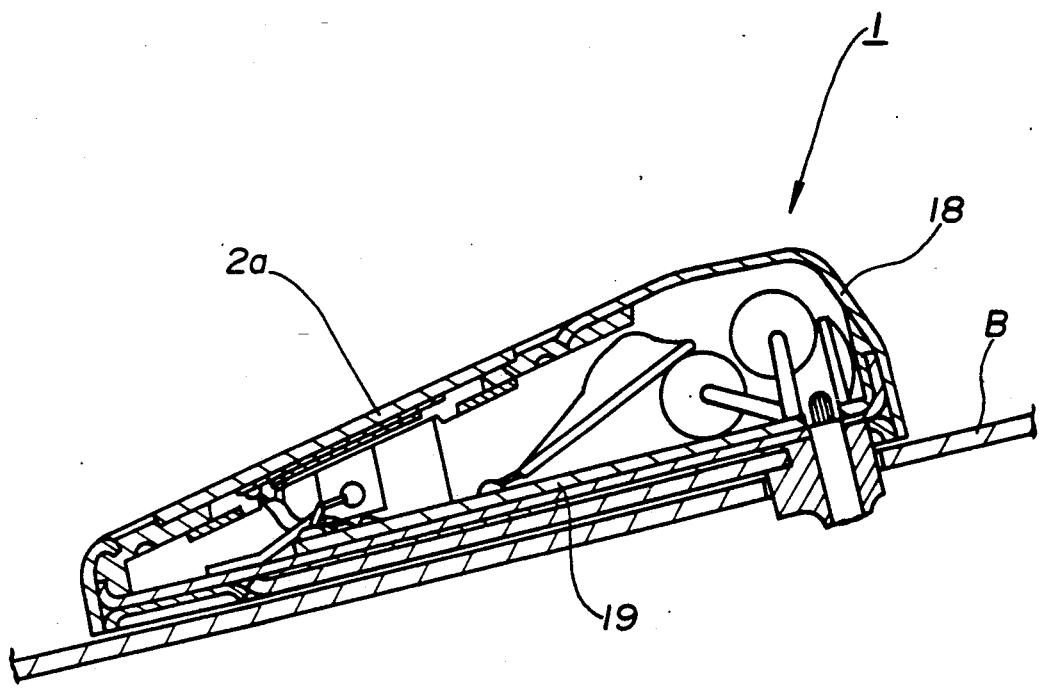
FIG. 3 is a sectional side view of the raindrop detector shown in FIG. 1 mounted on the car body.
Figure 4:
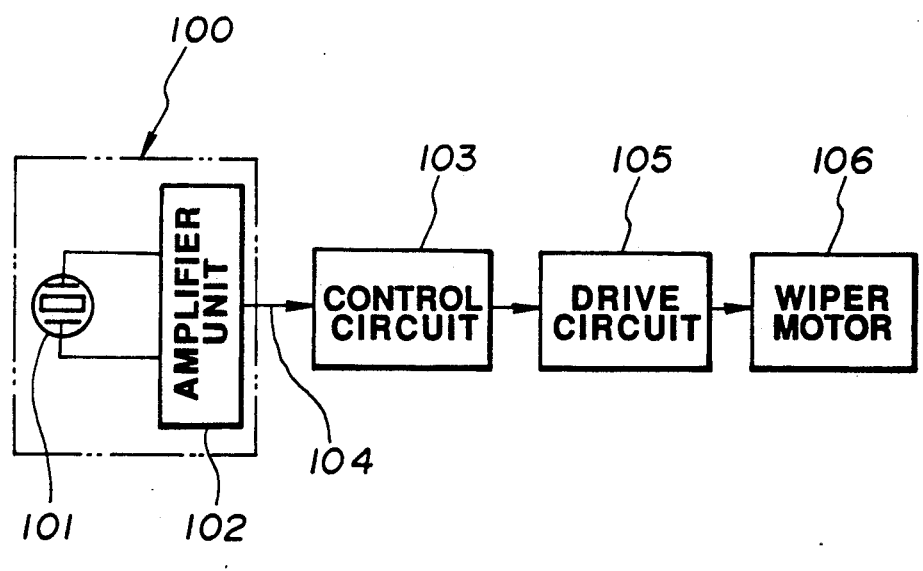
FIG. 4 is a schematic block diagram showing the conventional raindrop detector.

As shown in FIG. 2, an external input terminal (11) mounted on the raindrop detector (1) connects with ground through resistor $R_9$ and zener diode $ZD_1$. The (−) input terminal of the above-mentioned operational amplifier (7) is connected between the above-mentioned resistor $R_9$ and the zener diode $ZD_1$ through the above-mentioned resistor $R_2$.

Ground is connected to the above-mentioned (−) input terminal of the above-mentioned operational amplifier (7) while the emitter of the above-mentioned PNP-type transistor $Tr_1$ is connected to the above-mentioned resistor $R_2$.

The base of the above-mentioned PNP-type transistor $Tr_1$ connects with the emitter of the above-mentioned PNP-type transistor $Tr_1$ through the above-mentioned resistor $R_3$. The base of the PNP-type transistor $Tr_1$ connects with the collector of the NPN transistor $Tr_2$ through the resistor $R_4$.

The collector of the above-mentioned PNP-type transistor $Tr_1$ connects with the output terminal of the foregoing operational amplifier (7) through the above-mentioned resistor $R_5$. The output terminal of the above-mentioned operational amplifier (7) connects with the above-mentioned resistor $R_7$ through the foregoing resistor $R_6$.

The above-mentioned resistor $R_7$ connects with the above-mentioned capacitor $C_2$ and resistor $R_8$, both of which connect with ground, as well as the base of the above-mentioned NPN-type transistor $Tr_2$.

The emitter of the above-mentioned NPN-type transistor $Tr_2$ connects with ground. The above-mentioned output terminal (8) connects between the collector of the foregoing PNP-type transistor $Tr_1$ and the above-mentioned resistor $R_5$ through the above-mentioned diode $D_1$.

The cancel line (10) connected to a cancel terminal (9) connects between the above-mentioned resistors $R_6$ and $R_7$. The above-mentioned vibration detection unit (2) connects with the (+) input terminal of the above-mentioned operational amplifier (7) through the above-mentioned capacitor $C_1$ and resistor $R_1$ on the end while the other end connects with ground.

The above-mentioned output terminal (8) connects with a power terminal (4a) of one side, mounted on the wiper motor (4), through a drive circuit (12) while the power terminal (4b) of the other side, mounted on the wiper motor (4), connects with a movable contact (13a) of a relay (13) through a switch (20).

A fixed contact (13b) of the above-mentioned relay (13) is contained in the wiper motor (4) and connects with a contact (4g) of one side connecting and disconnecting an inner conducting plate (4d) and an outer conducting plate (4e) of the automatic stop mechanism (4c) interlocked to the wiper motor (4). A fixed contact (13c) connects with ground.

The (+) power connects with a contact (4f) of the other side connecting and disconnecting the outer conducting plate (4e) of the above-mentioned automatic stop mechanism (4c) while the above-mentioned contact (4g) on the other side of the automatic stop mechanism (4c) connects with the above-mentioned cancel terminal (9).

An output shaft (4h) of the above-mentioned wiper motor (4) is coupled with a wiper arm (16) mounted with a wiper blade (15) through a link joint (14), so that a wiper blade (15) wipes between respective turning positions (A and B) on a wiping surface (17) by revolution of the output shaft (4h).

When the vibration detection unit (2) of the raindrop detector (1) detects the vibration of raindrops while the switch (20) is set to the intermittent (INT) position, vibration components generated by the raindrops are coverted into electrical signals, which are converted into data signals by the operational amplifier (7) through capacitor $C^1$, and resistor $R^1$ for output of data signals through the output terminal of the operational amplifier (7).

The data signals are divided to resistors $R^5$ and $R^6$. However, a voltage is not applied to the base of the PNP-type transistor $Tr^1$ and transistor $Tr^1$ is in its off state. A bias applies to the base of the NPN-type transistor $Tr^2$ when the transistor is grounded through the resistors $R^7$ and $R^8$ to set the NPN-type transistor $Tr^2$ in its on state.

Setting up the NPN-type transistor $Tr^2$ to the on state grounds the power source connected to the external input terminal (11) through resistors $R^9$, $R^3$ and $R^4$ from the external input terminal (11) to apply a bias to the base of the PNP-type transistor $Tr^1$ and to change the transistor $Tr^1$ to its on state.

When the PNP-type transistor $Tr^1$ changes to the on state, the power is supplied to the above-mentioned output terminal (8) through the diode $D_1$.

The contact (4g) on one side of the automatic stop mechanism (4c) contacts with the outer conducting plate (4e) at this time, as the wiper blade (15) is at the stop position (B), and data signals from the above-mentioned vibration detection unit (2) are stored in the memory (5) to operate the wiper motor (4) through the drive circuit (12).

Actuation of the wiper motor (4) enables the wiper blade (15) to wipe between the respective turning positions (A and B) on the wiping surface.

The conducting plates (4d and 4e) of the automatic stop mechanism (4c) rotate, linking to the wiper motor (4), and the contact (4g) on one side contacts with the inner conducting plate (4d) so that the cancel terminal (9) is connected to the ground to cancel the memory data stored by the above-mentioned memory (5).

The wiper motor (4) continues to rotate until the contact (4g) on one side and contact (4f) on the other side of the automatic stop mechanism (4c) are connected electrically on the outer conducting plate (4e) and stops its own rotation when the above-mentioned contacts (4g and 4f) come in contact with each other.

While the wiper motor (4) rotates, the memory (5) does not accept data signals from the above-mentioned vibration detection unit (2).

After the wiper motor (4) stops, the wiper motor (4) rotates, letting the memory (5) store data signals when a new data signal is output by the above-mentioned vibration detection unit (2). This operation is repeated afterward.

Namely, since the raindrop detector (1) is provided with the memory (5) and the output signals from the memory (5) are input to the drive circuit (12), it is possible to control the wiper motor (4) by a simply structure system, additionally the transfer speed of the data signals increases, so that the response characteristics of the system are improved.

As described above, the raindrop detector according to this invention detects the vibration of raindrops and converts it into electrical signals by a vibration detection unit, converts the above-mentioned electrical signals into data signals by a signal converter unit, stores data of the above-mentioned data signals and outputs output signals to the wiper motor by a memory means and cancels the above-mentioned data according to an external signal every time of rotation of the wiper motor through the cancel means. Therefore, the data signals stored in the memory means are output to the drive circuit, and excellent effects can be obtained by using the raindrop detector according to this invention since it is possible to control the wiper motor by a simply structured system without using an intermittent drive circuit and the transfer speed of the data signal increases thereby improving the response characteristics of the system.

What is claimed is:

1. A raindrop detector comprising:
    a vibration detection unit for detecting raindrop vibration and converting said vibration into an electrical signal;
    a signal converter unit for converting said electrical signal into a data signal;
    a memory means for storing data of said data signal and outputting an output signal to a wiper motor;
    an automatic stop mechanism having inner and outer conducting plates interlockingly rotated with the rotation of an output shaft of said wiper motor, a first contact for contacting said outer conducting plate, and a second contact for contacting said inner conducting plate and said outer conducting plate separately according to the rotation of said inner and outer conducting plates; and
    a cancel means connected electrically to said second contact of said automatic stop mechanism for cancelling said data at every rotation of said outer conducting plate of said automatic stop mechanism.

2. A raindrop detector as claimed in claim 1, wherein said vibration detection unit, said signal converter unit, said memory means and said cancel means are housed in a single shielding case.

* * * * *